(12) United States Patent
Hasegawa et al.

(10) Patent No.: US 7,885,484 B2
(45) Date of Patent: Feb. 8, 2011

(54) IMAGE PROCESSING METHOD AND IMAGE PROCESSING APPARATUS

(75) Inventors: Tomohiko Hasegawa, Nagoya (JP); Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1074 days.

(21) Appl. No.: 11/605,963

(22) Filed: Nov. 30, 2006

(65) Prior Publication Data
US 2007/0122050 A1 May 31, 2007

(30) Foreign Application Priority Data
Nov. 30, 2005 (JP) ............................ P2005-346922

(51) Int. Cl.
*G06K 9/32* (2006.01)
(52) U.S. Cl. .................. 382/298; 382/254; 345/670
(58) Field of Classification Search ........................ None
See application file for complete search history.

(56) References Cited

U.S. PATENT DOCUMENTS

| | | | | |
|---|---|---|---|---|
| 6,563,548 | B1 * | 5/2003 | Shimada | 348/607 |
| 6,873,912 | B2 * | 3/2005 | Shimomura | 701/301 |
| 7,110,599 | B1 * | 9/2006 | Moriya et al. | 382/170 |
| 7,444,026 | B2 * | 10/2008 | Fujimoto | 382/236 |
| 2005/0134870 | A1 * | 6/2005 | Kugo | 358/1.2 |
| 2006/0193017 | A1 * | 8/2006 | Zuber | 358/504 |

FOREIGN PATENT DOCUMENTS

| | | |
|---|---|---|
| JP | 11-308620 | 11/1999 |
| JP | 2001-273491 | 10/2001 |

* cited by examiner

*Primary Examiner*—Bhavesh M Mehta
*Assistant Examiner*—Gregory F Cunningham
(74) *Attorney, Agent, or Firm*—Baker Botts L.L.P.

(57) ABSTRACT

A method for processing an image includes: determining a reduction ratio that falls within a predetermined range; generating reduced image data indicative of a reduced image based on original image data indicative of an original image by dimensionally reducing the size of the original image to the size of the reduced image by the determined reduction ratio, the reduced image data indicating density values of pixels contained in the reduced image; and emphasizing edges in the reduced image by amplifying a change in the density values of pixels belonging to the edges in the reduced image based on the density values of the pixels contained in the reduced image. The emphasizing edges includes: correcting the density values of the pixels in the reduced image data by using correction data; and modifying the correction data to be used for correction of the density values of the pixels in the reduced image data, the correction data being modified dependently on the reduction ratio, to thereby vary a level of amplification of the change in the density values dependently on the reduction ratio.

16 Claims, 10 Drawing Sheets

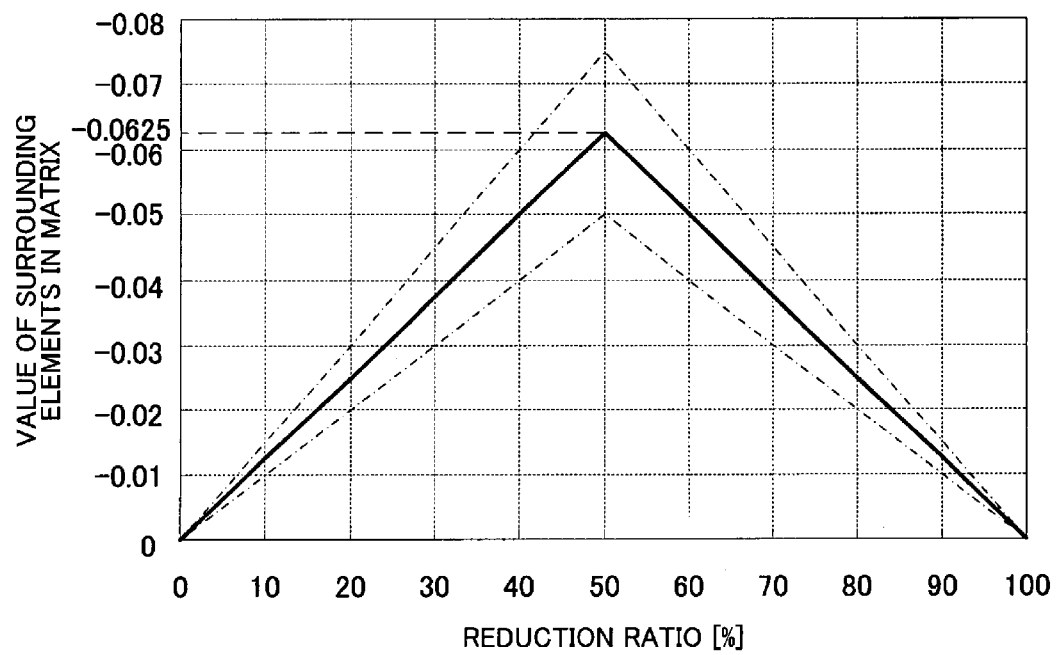

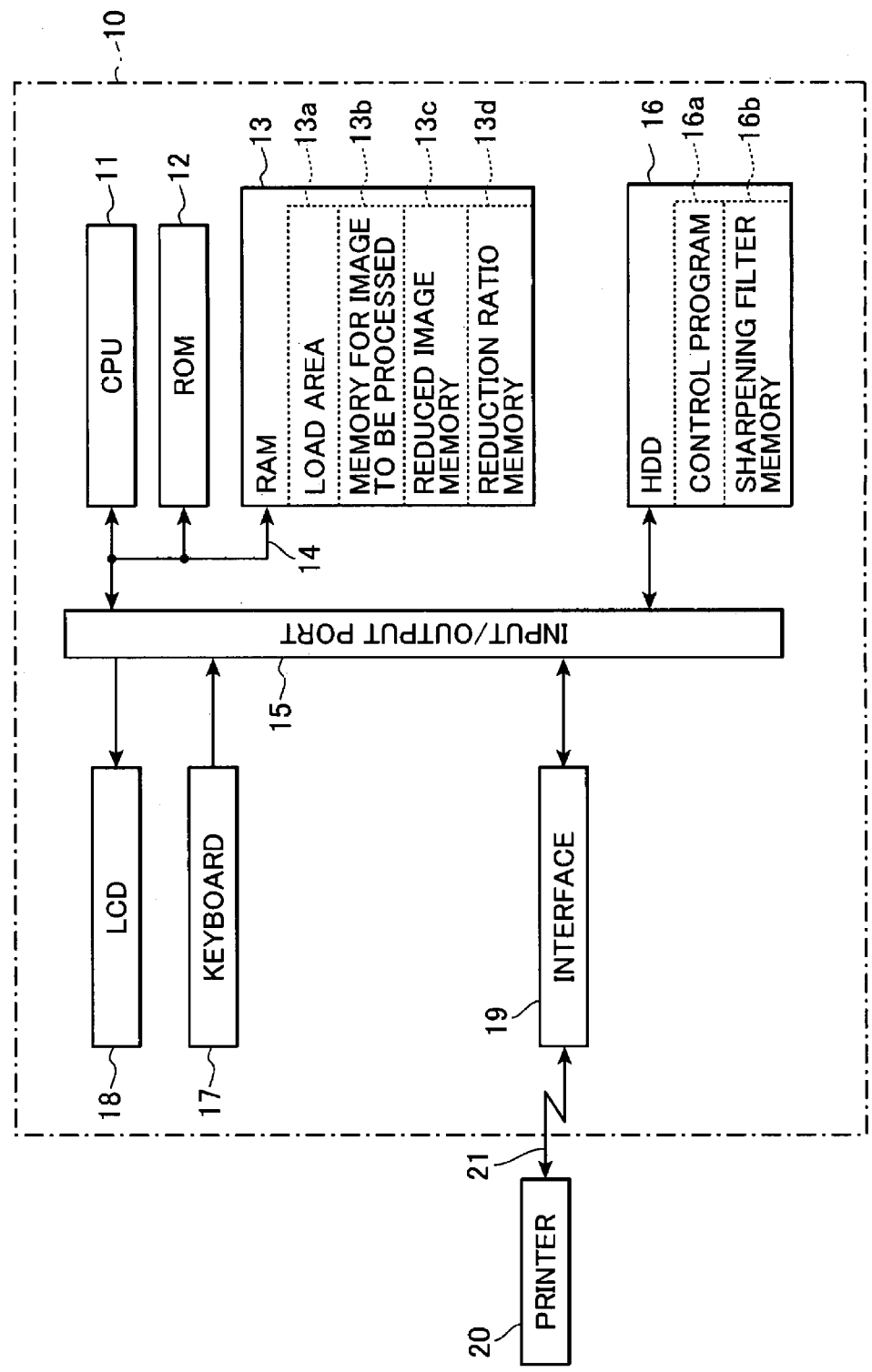

FIG.3A

| -0.0625 | -0.0625 | -0.0625 |
|---|---|---|
| -0.0625 | 1.5 | -0.0625 |
| -0.0625 | -0.0625 | -0.0625 |

FIG.3B

| -0.03125 | -0.03125 | -0.03125 |
|---|---|---|
| -0.03125 | 1.25 | -0.03125 |
| -0.03125 | -0.0625 | -0.03125 |

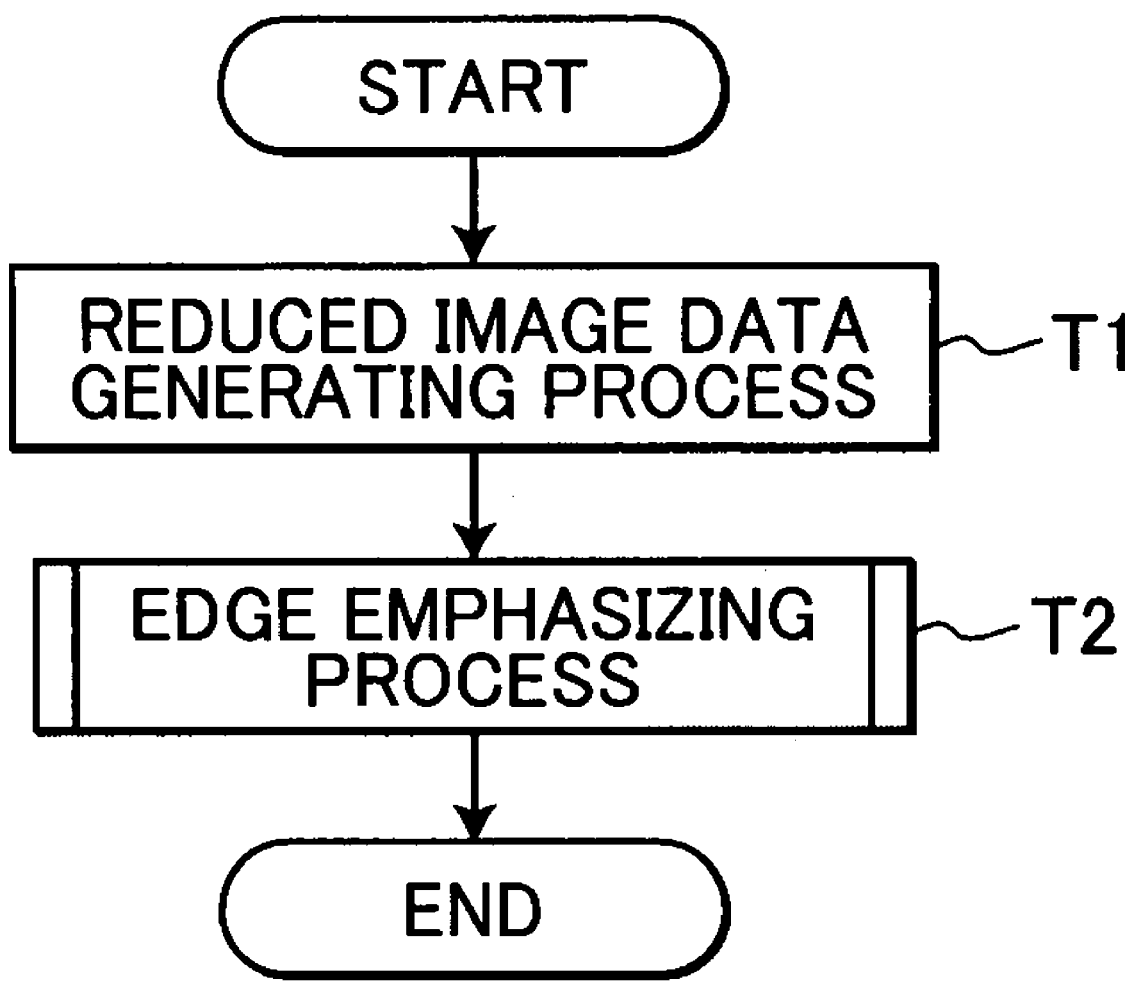

FIG.7A

| $-1/2^n$ | $-1/2^n$ | $-1/2^n$ |
|---|---|---|
| $-1/2^n$ | $1+8*(1/2^n)$ | $-1/2^n$ |
| $-1/2^n$ | $-1/2^n$ | $-1/2^n$ |

FIG.7B

| −0.0625 | −0.0625 | −0.0625 |
|---|---|---|
| −0.0625 | 1.5 | −0.0625 |
| −0.0625 | −0.0625 | −0.0625 |

FIG.7C

| −0.03125 | −0.03125 | −0.03125 |
|---|---|---|
| −0.03125 | 1.25 | −0.03125 |
| −0.03125 | −0.0625 | −0.03125 |

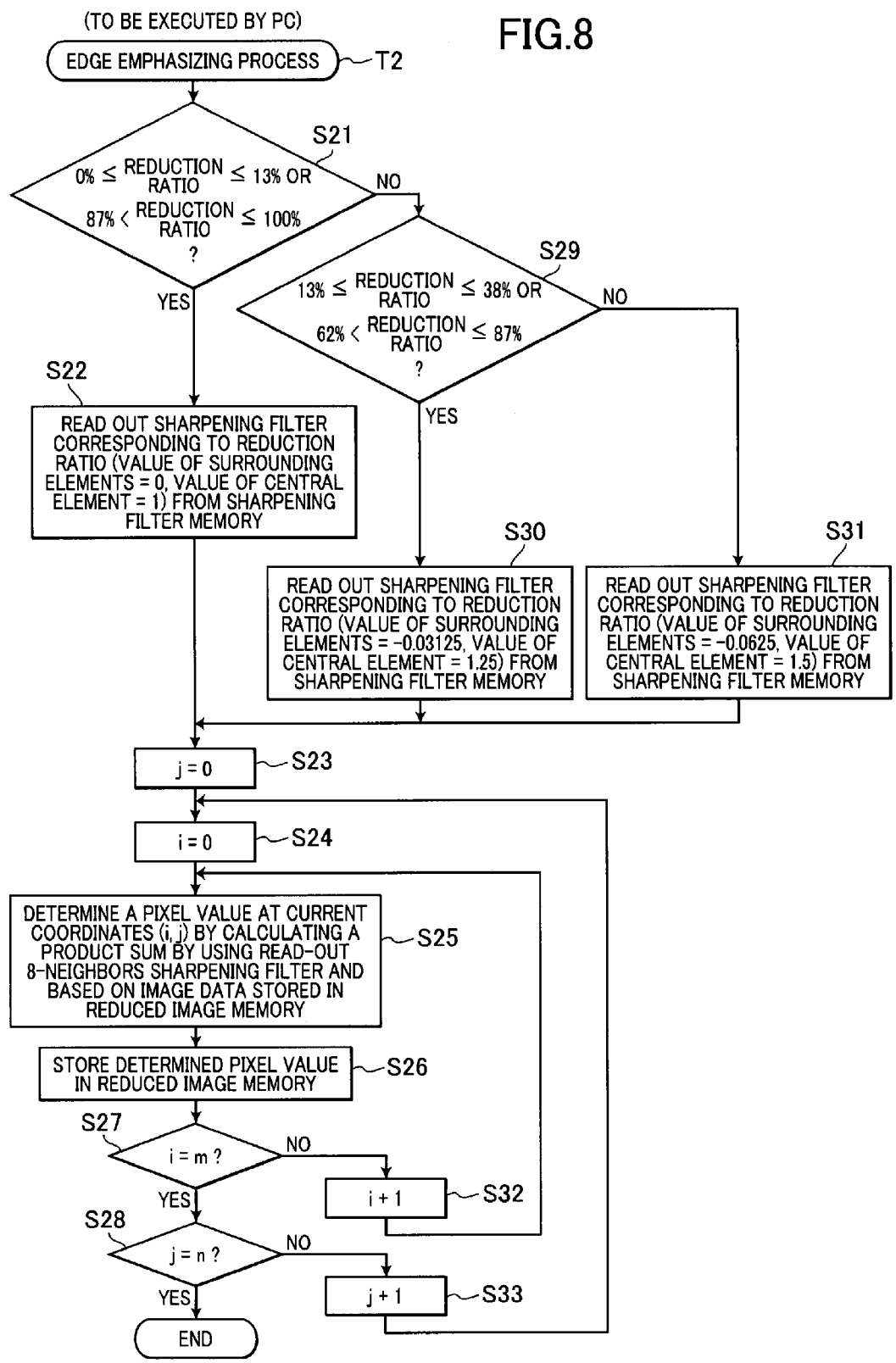

IMAGE PROCESSING METHOD AND IMAGE PROCESSING APPARATUS

CROSS REFERENCE TO RELATED APPLICATION

This application claims priority from Japanese Patent Application No. 2005-346922 filed Nov. 30, 2005, the entire content of which is incorporated herein by reference.

TECHNICAL FIELD

The disclosure relates to an image processing method and an image processing apparatus for emphasizing edges of profiles in a dimensionally-reduced image obtained by dimensionally reducing an original image.

BACKGROUND

The nearest neighbor method, the bi-linear method, the bi-cubic method and the average pixel method are among the techniques that have been and are being used for dimensionally reducing images prepared by personal computers (to be referred to as PCs hereinafter).

The nearest neighbor method is a technique of adopting the density value of the pixel located closest to a pixel subjected to pixel interpolation for dimensional reduction. The nearest neighbor method is an interpolation technique that allows the quickest computation. That is, the pixels of the original image are simply thinned. Thus, the image quality tends to be degraded, e.g. apparent jaggies are generated in the dimensionally reduced image.

On the other hand, according to the bi-linear method and the bi-cubic method, the position coordinates of a pixel in the original image that correspond to the position coordinates of each pixel in a dimensionally-reduced image are determined. Then, the pixel value of each pixel in the dimensionally reduced image (density value of each pixel) is determined as equal to the average value of the pixel value of a pixel in the original image that has the corresponding position coordinates (center pixel) and of the weighted pixel values of a plurality of pixels around the subject pixel.

The average pixel method is an averaging and dimensionally reducing technique that takes into consideration the area of each pixel in the original image and the area of each pixel in the corresponding dimensionally reduced image. With the average pixel method, the least common multiple of the number of pixels of the original image and that of the reduced image are determined and the original image is expanded to the least common multiple times of the original size. Then, the expanded image is divided by the number of pixels of the reduced image and the average of the pixel values of each of the areas produced by the division is determined and used as a pixel value for the reduced image. With this arrangement, the pixel values of all the pixels in the reduced image can be determined.

With the bi-linear method, the bi-cubic method and the average pixel method, jaggies in the generated reduced image can be suppressed and hence high quality reduced images if compared with the nearest neighbor method can be provided. Particularly, the average pixel method has been and being popularly used because the pixel method can provide high quality reduced images.

SUMMARY

However, pixel values are averaged according to each of the bi-linear method, the bi-cubic method and the average pixel method. So, pixel values of edges of profiles where pixel values (density values of pixels) should change abruptly change only mildly. Then, the sharpness of the image tends to be degraded. Particularly, the tendency becomes remarkable with the average pixel method if the degree of dimensional reduction is large. So, it is preferable to execute an edge emphasizing process (sharpening process) to boost or amplify the changes in density values of pixels at the edges of a reduced image, thereby emphasizing the edges and suppressing the tendency.

Such an edge emphasizing process is executed by subjecting the pixel values of the reduced image to a filtering process, using a sharpening filter in a 3×3 matrix form. Sharpening filters formed on the basis of a Laplacian filter are widely known.

A Laplacian filter is designed for obtaining the second-order differential of an image and generally has a form of a 3×3 matrix. In a Laplacian filter matrix, the component value (filter element value) of the center element differs from the component values (the filter element values) of the eight surrounding elements neighboring the center element, and the component value of the center element is equal to a value that is obtained by inverting the sign of the total sum of the component values of the eight surrounding elements. One representative example of a Laplacian filter has its eight surrounding elements having component values of +1 and its center element having a component value of −8 as shown in FIG. 1A.

An edge-emphasized and dimensionally-reduced image can be obtained by subtracting, from the pixel values of the pre-filtered reduced image that has not yet been subjected to the Laplacian-filter filtering process, the pixel values of the post-filtered reduced image that has been subjected to the Laplacian-filter filtering process. So, a sharpening filter is formed on the basis of a Laplacian filter by taking such an operation into consideration. Generally, an 8 neighbors sharpening filter has a 3×3 matrix form. The component values of the surrounding elements show a sign opposite to the sign of the component value of the center element. The component value of the center element is defined to be a sum of one (1) and a value that is obtained by inverting the sign of the total sum of the component values of the eight surrounding elements. One representative example of an 8-neighbors sharpening filter has its eight surrounding elements having a component value of −1 and its center element having a component value of +9 as shown in FIG. 1B.

In an edge emphasizing filtering process, an 8-neighbors sharpening filter in the 3×3 matrix form is used. That is, the component values of the nine elements in the 8-neighbors sharpening filter and the pixel values of the nine pixels including the pixel (center pixel) that is the object of processing and eight pixels surrounding the center pixel are subjected to an operation of determining a product sum. More specifically, the pixel value of the center pixel is multiplied by the component value of the center element in the 8-neighbors sharpening filter, while the pixel values of the eight surrounding pixels are multiplied respectively by the component values of the corresponding surrounding elements, and a total sum of the obtained products is determined. The determined sum is set as the value of the object pixel of the filtered reduced image. In such an edge emphasizing filtering process, therefore, the value of a pixel that is the object of processing is determined by considering the values of its surrounding pixels. Thus, the component values of the surrounding elements in the sharpening filter operate as weighting coefficients for controlling the degree of affecting the pixel values of the surrounding pixels to the pixel value of the object pixel.

By subjecting a dimensionally reduced image to an edge emphasizing process as described above, the change in the density values in the edges in a dimensionally reduced image, whose density values have been made to change only mildly through the reduction process, can be emphasized and hence a sharp image can be produced.

However, there may be a demand for various reduction ratios when producing dimensionally reduced images. Then, a wide range of ratios for dimensionally reducing images needs to be provided so as to be able to meet the demand.

It is noted that as the reduction ratio varies, the extent, to which the change in the density values at an edge is smoothed, also varies. When the available range of reduction ratios is relatively wide, reduced images are formed with various different reduction ratios. Then, there will arise a problem that the extent of reduction of a dimensionally reduced image will not match the edge emphasizing sharpening filter to be used.

Using such an inappropriate edge emphasizing sharpening filter will result in that edges of profiles may be emphasized too much to provide an unnatural image, or may be emphasized too little to provide unclear edges. High quality reduced images cannot be provided. So, it is required to emphasize edges in a dimensionally reduced image to a proper extent regardless of the reduction ratio.

In view of the above, an object of the invention is to provide an image processing method and an image processing apparatus that can emphasize edges of profiles to an extent that matches the reduction ratio of any dimensionally reduced image.

In order to attain the above and other objects, the invention provides a method for processing an image, including: determining a reduction ratio that falls within a predetermined range; generating reduced image data indicative of a reduced image based on original image data indicative of an original image by dimensionally reducing the size of the original image to the size of the reduced image by the determined reduction ratio, the reduced image data indicating density values of pixels contained in the reduced image; and emphasizing edges in the reduced image by amplifying a change in the density values of pixels belonging to the edges in the reduced image based on the density values of the pixels contained in the reduced image. The emphasizing edges includes: correcting the density values of the pixels in the reduced image data by using correction data, thereby amplifying the change in the density values of the pixels belonging to the edges in the reduced image; and modifying the correction data to be used for correction of the density values of the pixels in the reduced image data, the correction data being modified dependently on the reduction ratio, to thereby vary a level of amplification of the change in the density values dependently on the reduction ratio.

According to another aspect, the invention provides an image processing apparatus, including: a reduced image data storage portion; an image data write portion; a reduction ratio storage portion; and an edge emphasizing portion. The reduced image data storage portion stores reduced image data indicative of density values of pixels contained in a reduced image that is produced by dimensionally reducing an original image by a reduction ratio that falls within a predetermined range. The image data write portion writes the reduced image data in the reduced image data storage portion. The reduction ratio storage portion stores the reduction ratio indicative of a size of the reduced image relative to a size of the original image. The edge emphasizing portion emphasizes edges in the reduced image by amplifying a change in the density values of pixels belonging to the edges in the reduced image based on the density values of the pixels contained in the reduced image, the edge emphasizing portion outputting the edge-emphasized reduced image data. The edge emphasizing portion includes: a correction data processing portion; and a modification portion. The correction data processing portion corrects the density values of the pixels in the reduced image data stored in the reduced image data storage portion by using correction data, thereby amplifying the change in the density values of the pixels belonging to the edges in the reduced image. The modification portion modifies the correction data to be used by the correction data processing portion, the modification portion modifying the correction data dependently on the reduction ratio stored in the reduction ratio storage portion, to thereby vary a level of amplification of the change in the density values dependently on the reduction ratio.

According to another aspect, the invention provides a storage medium storing a set of program instructions executable on a data processing device for processing images, the instructions including: determining a reduction ratio that falls within a predetermined range; generating reduced image data indicative of a reduced image based on original image data indicative of an original image by dimensionally reducing the size of the original image to the size of the reduced image by the determined reduction ratio, the reduced image data indicating density values of pixels contained in the reduced image; and emphasizing edges in the reduced image by amplifying a change in the density values of pixels belonging to the edges in the reduced image based on the density values of the pixels contained in the reduced image, the emphasizing edges including: correcting the density values of the pixels in the reduced image data by using correction data, thereby amplifying the change in the density values of the pixels belonging to the edges in the reduced image; and modifying the correction data to be used for correction of the density values of the pixels in the reduced image data, the correction data being modified dependently on the reduction ratio, to thereby vary a level of amplification of the change in the density values dependently on the reduction ratio.

BRIEF DESCRIPTION OF THE DRAWINGS

Illustrative aspects in accordance with the invention will be described in detail with reference to the following figures wherein:

FIG. 1A shows an example of a Laplacian filter;

FIG. 1B shows an example of a sharpening filter;

FIG. 1C is a schematic block diagram illustrating the electric configuration of a personal computer storing an image processing program according to a first embodiment of the invention;

FIG. 2 is a graph showing a relationship between the reduction ratio and the component value of surrounding elements in a sharpening filter, to illustrate the concept of the sharpening filter determined by arithmetic formulas stored in a sharpening filter memory shown in FIG. 1C;

FIGS. 3A and 3B schematically illustrate sharpening filters that are determined based on the arithmetic formulas stored in the sharpening filter memory;

FIG. 5A is a flowchart of an image processing process that is executed by the image processing program according to the first embodiment of the invention;

FIGS. 6A and 6B schematically illustrate the component values of the surrounding elements in the 8-neighbors sharpening filters stored in the sharpening filter memory according to a modification of the first embodiment, wherein FIG. 6A is a graph illustrating the theoretical concept of the sharpening filters of the present modification by showing the corresponding relationship between the reduction ratios and the component values of the surrounding elements and FIG. 6B is a graph illustrating the corresponding relationship between the reduction ratios and the component values that are actually stored in the sharpening filter memory according to the modification;

FIGS. 7A through 7C schematically illustrate 8-neighbors sharpening filters that are used in the edge emphasizing process according to the modification of the first embodiment;

FIG. 8 is a flowchart of the edge emphasizing process according to the modification of the first embodiment.

DETAILED DESCRIPTION

Figure 4A:
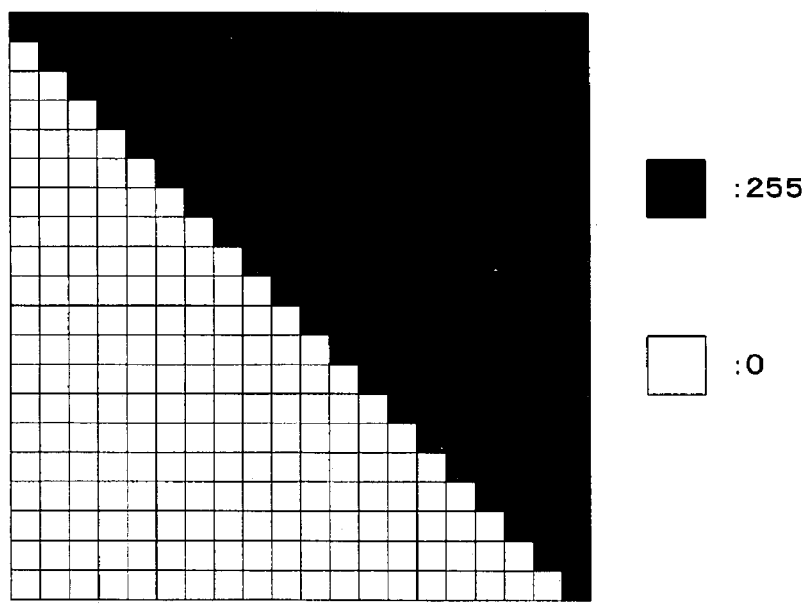
FIGS. 4A through 4C schematically illustrate the process of producing a reduced image through an image processing program of the first embodiment.

An image processing method and an image processing apparatus according to some aspects of the invention will be described while referring to the accompanying drawings wherein like parts and components are designated by the same reference numerals to avoid duplicating description.

FIG. 1C is a schematic block diagram illustrating the electric configuration of a printing system 100. The printing system 100 has a personal computer (to be referred to as PC hereinafter) 10 storing ah image processing program according to a first embodiment of the invention. As shown in FIG. 1C, the printing system 100 includes the PC 10 and a printer 20 connected to the PC 10.

The PC 10 is an apparatus for preparing image data indicative of an image and outputting the image data to the printer 20. The PC 10 can reduce the size of the image of the image data within a range between 0% and 100% (except 0% and 100%).

As shown in FIG. 1C, the PC 10 includes a CPU 11, a ROM 12, a RAM 13, a hard disk drive (HDD) 16, a keyboard 17, a liquid crystal display (to be simply referred to as LCD hereinafter) 18 and a printer interface 19 for connecting the PC 10 to the printer 20.

The CPU 11 is an operation unit that operates according to the control programs for the purpose of performing various information processing operations. The control programs include: programs stored in the ROM 12, and the operating system (OS), the image processing program according to the present embodiment, and other various types of image processing programs which are stored in the HDD 16.

The ROM 12 is a read only memory storing the basic programs for operating the CPU 11 as well as various data.

The RAM 13 is a rewritable memory for temporarily storing data and programs necessary for various processing operations the CPU 11 performs. The RAM 13 includes a load area 13a, a memory for storing images to be processed 13b, a reduced image memory 13c and a reduction ratio memory 13d.

The load area 13a is an area for loading any of the control programs stored in the hard disk 16. Any of the various programs stored in the hard disk 16 is read out from the hard disk 16 when necessary (at the time of execution) and stored in the load area 13a. The image processing program of the present embodiment that is stored in the hard disk 16 as an application program is also stored in the load area 13a at the time of execution. The CPU 11 accesses the program stored in the load area 13a and executes the program.

The memory for storing images to be processed 13b is a memory for storing image data indicative of an original image to be edited, such as to be dimensionally reduced. The user can prepare the original image by driving the user's desired image processing program and by performing a predetermined input operation. The image data of the image thus prepared according to the input operation of the user is then stored in the memory for storing images to be processed 13b on a page by page basis. The image processing program of the present embodiment is adapted to edit the thus prepared image (image data of a page) for reduction, expansion and/or rotation. The edited image data is then stored in a memory that is provided apart from the memory for storing images to be processed 13b, while the original image data is stored in the memory for storing images to be processed 13b.

The reduced image memory 13c is a memory for storing reduced image data of images prepared by reducing original images. In this embodiment, the reduced image data is produced based on the original image data (image data stored in the memory for storing images to be processed 13b) according to the average pixel method.

When dimensionally reducing an image, the pixels of the original image need to be thinned according to the reduction ratio. If the reduction ratio is 50%, the number of pixels of the reduced image needs to be reduced to about a half of the number of pixels of the original image. With the average pixel method, the pixel values of the original image data (such as the RGB values) are averaged for every predetermined number of pixels, taking into consideration the area that each pixel occupies in the original image and the area that each pixel occupies in the reduced image to be produced, and the obtained average value is used as a pixel value of the image data of the reduced image. Generally, the least common multiple of the number of pixels of the original image and that of the reduced image is determined and the original image is expanded by multiplying the original image by the least common multiple. Then, the expanded image is divided by the number of pixels of the reduced image to be produced and the pixel values of each of the areas produced by the division are averaged. Then, the obtained average values are used as the pixel values of the reduced image. With this arrangement, pixel values are determined for the number of pixels of the reduced image.

After the reduced image data is thus prepared by editing the original image data, the user may want to prepare an expanded image for the original image. If the reduced image data were used for the expansion process, the expanded image will show a poor image quality. Therefore, when preparing an expanded image, it is preferable to prepare expanded image data based on the original image data. Accordingly, the original image data is held. That is, the image data stored in the memory for storing images to be processed 13b is not overwritten by the prepared reduced image data, but the prepared reduced image data is stored in the reduced image memory 13c provided apart from the memory for storing images to be processed 13b.

The reduction ratio memory 13d is a memory for storing the reduction ratio of the reduced image to be produced. In this embodiment, any percent for the reduction ratio can be selected with a step of 1% relative to the original image. The range of reduction ratio for producing a reduced image is between 0% and 100% except for 0% and 100%, that is, greater than or equal to 1% and smaller than or equal to 99%, relative to the original image. When a reduction ratio is input (specified) by a predetermined input operation of the user, the input value is stored in the reduction ratio memory 13d. More specifically, the CPU 11 recognizes the inputted reduction ratio and writes the ratio in the reduction ratio memory 13d to thereby determine a reduction ratio for the reduced image data to be generated.

The reduction ratio as used herein refers to the ratio of the size of the reduced image to be produced relative to that of the original image. If, for example, the reduction ratio is 75%, the size of the reduced image to be produced is 75% of that of the original image. Similarly, if the reduction ratio is 50%, the size of the reduced image is 50% of that of the original image and, if the reduction ratio is 25%, the size of the reduced image is 25% of that of the original image.

As shown in FIG. 1C, the CPU 11, the ROM 12 and the RAM 13, which are described above, are connected to each other by way of a bus line 14. The bus line 14 is connected to an input/output port 15. The HDD 16, the keyboard 17, the LCD 18 and the interface 19 are connected to the input/output port 15 in addition to the bus line 14.

The HDD 16 is a hard disk reading apparatus including a hard disk, and stores therein a control program 16a and a sharpening filter memory 16b. The control program 16a includes an OS program and various application programs including the image processing program of the present embodiment and other types of image processing programs. As described above, the image processing program of the present embodiment is adapted to execute an editing process that may involve reduction, expansion and/or rotation, on images (image data of a single page) prepared by other image processing programs. FIG. 5A shows the flowchart of an image reduction process that is executed by the image processing program of the present embodiment when the user inputs his/her desire to reduce original image data. The image processing program of the present embodiment may be originally stored in other data storage media, such as a CD, DVD, and the like, that is readable by the PC 10 and may be downloaded to the HDD 16, or may be downloaded to the HDD 16 from a network such as the Internet.

The sharpening filter memory 16b is a memory for storing information on a sharpening filter to be used for emphasizing (sharpening) the edges of the reduced image. In this embodiment, the sharpening filter memory 16b stores not a sharpening filter, but arithmetic formulas for determining a sharpening filter using the reduction ratio as a variable. With this arrangement, the CPU 11 can execute an edge emphasizing process, using a sharpening filter that varies as a function of the reduction ratio. The sharpening filter will be described below in detail.

Generally, a change in the density values of pixels (an edge of a profile in the images) can be detected by determining the first order differentials for the pixel values (density values or RGB values). It is possible to obtain an image where the change in the density values at the edge is amplified, by subtracting, from the original pixel values, the results obtained by determining the differentials for the change in the density values, that is, the second order differentials for the original pixel values.

Laplacian filters are known as filters designed for obtaining the second-order differentials of image data. An 8-neighbors Laplacian filter in a 3×3 matrix form includes 9(=3×3) component values (filter elements), wherein the component value of the center element in the matrix differs from the component values of the eight surrounding elements that surround the center element. The component values of all the eight surrounding elements are equal to one another and the component value of the center element is equal to a value obtained by inverting the sign of the total sum of the component values of the eight surrounding elements.

A sharpening filter is formed on the basis of a Laplacian filter. The sharpening filter is a filter for subtracting, from image data, second-order differential of the image data that is obtained by subjecting the image data to the Laplacian filter. An 8-neighbors sharpening filter is used as the sharpening filter in this embodiment. The 8-neighbors sharpening filter is also in a 3×3 matrix form, and has nine component values (filter elements). The component value of the center element shows a sign opposite to the signs of the component values of the surrounding elements. The component values of the eight surrounding elements are equal to one another and are defined based on the component values of the Laplacian filter. The component value of the center element is defined to be a sum of one (1) and a value obtained by inverting the sign of the total sum of the component values of the eight surrounding elements.

The sharpening filter memory 16b stores the arithmetic formulas for computationally determining the component values of the surrounding elements in the sharpening filter. Since the component value of the center element is determined by the component values of the surrounding elements, the sharpening filter can be determined when the component values of the surrounding elements are computationally determined by the arithmetic formulas stored in the sharpening filter memory 16b.

Now, the arithmetic formulas stored in the sharpening filter memory 16b to determine the sharpening filter to be used for this embodiment, will be described by referring to FIG. 2.

FIG. 2 is a graph showing the corresponding relationship between the reduction ratio and the component value of the surrounding elements of the sharpening filter, and therefore illustrates the concept of the sharpening filter determined by the arithmetic formulas stored in the sharpening filter memory 16b.

In this embodiment, the sharpening filter memory 16b stores the following two linear functions (1) and (2) as arithmetic formulas for computationally determining the component values of the surrounding elements.

$$x=-(0.125 \times \text{reduction ratio}/100) \qquad (1)$$

$$x=-(-0.125 \times (\text{reduction ratio}-50)/100+0.0625) \qquad (2)$$

wherein x represents the values of the surrounding elements in the sharpening filter.

The arithmetic formula (1) is for computationally determining the component values of the surrounding elements for the range of reduction ratio from 0% to 50% (more than 0% and less than 50%), while the arithmetic formula (2) is for computationally determining the component values of the surrounding elements for the range of reduction ratio from 50% to 100% (greater than or equal to 50% and less than 100%). In FIG. 2, the horizontal axis indicates the reduction ratio and the vertical axis indicates the component values of the surrounding elements.

As seen from FIG. 2, the arithmetic formula (2) for computationally determining the component values of the surrounding elements is so designed that the component values become equal to zero (0) when the reduction ratio is 100% and gradually decrease (in other words, the absolute values thereof gradually increase) as the reduction ratio decreases from 100%. Thus, the component values that are determined by the arithmetic formula (2) are the smallest (the absolute values thereof are largest) when the reduction ratio is 50% within the range of reduction ratio between 50% and 100%.

The other arithmetic formula (1) for computationally determining the component values of the surrounding elements is so designed that the component values become equal to 0 when the reduction ratio is 0% and gradually increase (in other words, the absolute values thereof gradually decrease) as the reduction ratio rises from 0%. Thus, the component values that are determined based on the arithmetic formula (1) are smallest (the absolute values thereof are largest) when the reduction ratio is 50% within the range of reduction ratio between 0% and 50%. Note that the component values of the surrounding elements are determined by using the arithmetic formula (2) when the reduction ratio is 50%.

Thus, as indicated by the solid lines in FIG. 2, the component values of the surrounding elements that are computationally determined according to the two arithmetic formulas of linear functions stored in the sharpening filter memory 16b gradually decrease as the reduction ratio falls from 100% and take the smallest value of −0.0625 when the reduction ratio is 50%. Then, they gradually increase as the reduction ratio falls further from 50%. In this way, the component values of the surrounding elements are determined continuously relative to the change in the reduction ratio and hence optimal component values are selected for any reduction ratio.

The arithmetic formulas to be used for computationally determining the component values are not limited to those described above. It is possible to employ some other linear functions that make the component values of the surrounding elements equal to "0" when the reduction ratio is 0% and 100%, that make the component values smallest when the reduction ratio is 50%, and that set the component values at the reduction ratio of 50% to fall within a range of −0.05 and −0.075 (a range of ±20% relative to −0.0625). Component values that the surrounding elements can take based on such linear functions fall within the range between two chain lines in FIG. 2.

Furthermore, the arithmetic formulas to be used for computationally determining the component values are not limited to those that make the component values of the surrounding elements smallest (the absolute values thereof largest) when the reduction ratio is 50%. It is possible to employ other arithmetic formulas that make the component values smallest when the reduction ratio is in a range greater than or equal to 43% and smaller than or equal to 57%. The component values of the surrounding elements can take a value of −0.0625 when the reduction ratio is in the range greater than or equal to 43% and smaller than or equal to 57% as shown in FIG. 2.

FIGS. 3A and 3B schematically illustrate examples of sharpening filters that are determined based on the arithmetic formulas stored in the sharpening filter memory 16b. FIG. 3A shows an 8-neighbors sharpening filter that is determined when the reduction ratio is 50%, while FIG. 3B shows an 8-neighbors sharpening filter that is determined when the reduction ratio is 25% or 75%.

As shown in FIG. 2, the component values of the surrounding elements in the sharpening filter determined based on the two arithmetic formulas of linear functions stored in the sharpening filter memory 16b reflect the reduction ratio. The component value of the center element is determined by adding one to a value obtained by inverting the sign of the total sum of the component values of the eight surrounding elements. Thus, the sharpening filter is determined when the component values of the surrounding elements are computationally determined.

More specifically, when the reduction ratio is 50% and the computationally-determined component values of the surrounding elements are equal to "−0.0625", the component value of the center element is "1.5". As a result, an 8-neighbors sharpening filter of a 3×3 matrix form is determined as shown in FIG. 3A, wherein "1.5" is assigned to the center element and "−0.0625" is assigned to the surrounding elements.

When the reduction ratio is 25% or 75% and the computationally-determined component values of the surrounding elements are equal to "−0.03125", the component value of the center element is "1.25". As a result, an 8-neighbors sharpening filter of a 3×3 matrix form is determined as shown in FIG. 3B, wherein "1.25" is assigned to the center element and "−0.03125" is assigned to the surrounding elements.

In the sharpening filter, the component value of the center element becomes large when the absolute values of the component values of the surrounding elements become large. As a result, the difference between the component values of the surrounding elements and the component value of the center element increases to improve the level of amplification of the sharpening filter that amplifies the change in the density values. In other words, a sharpening filter that operates for a high level of amplification is produced when the absolute values of the component values of the surrounding elements are large. Therefore, a sharpening filter that operates for a high level of amplification is produced as the reduction ratio decreases from 100% and the level of amplification of the sharpening filter becomes highest when the reduction ratio is 50%. Thereafter, the level of amplification of the sharpening filter gradually falls as the reduction ratio decreases from 50%.

Thus, as the reduction ratio falls from 100%, the extent of amplifying the change in the density values at the edges of a reduced image is raised (and hence the edges are emphasized strongly) and the edges are emphasized with the highest level of amplification when the reduction ratio is 50%. As the reduction ratio further falls from 50%, the extent of amplifying the change in the density values at the edges of the reduced image falls to produce an image where edges are emphasized to a small extent.

It is noted that when a reduced image is prepared with the average pixel method, jaggies are suppressed and the reduced image of a high image quality can be prepared. On the other hand, with the average pixel method, the density change at the edges is mild and the sharpness (clearness) of the edges may be degraded in the produced reduced image if compared with the original image because the pixel values of the reduced image data are those obtained by averaging a predetermined number of pixel values of the original image data, the predetermined number varying as a function of the reduction ratio. Thus, an edge emphasizing process is executed to emphasize the edges of the produced reduced image by using a sharpening filter. The edge emphasizing process is executed by subjecting the component values of the sharpening filter matrix to an operation of determining a product sum for each pixel value in the reduced image data (filtering process).

The reduction ratio is selected by the user and is a variable between 1% and 99% that is determined according to the input value given by the user. As the reduction ratio changes, the extent to which the edges of the produced reduced image should be sharpened also changes. More specifically, as the reduction ratio falls and hence the produced reduced image becomes smaller, the sharpness of the edges also falls because the number of pixels that are subjected to averaging increases. Thus, when the reduction ratio varies, the distinctness at the edges in the produced reduced image (the reduced image to be subjected to an edge emphasizing process) also varies.

The image processing program of this embodiment is adapted to execute an edge emphasizing process on a dimensionally-reduced image by using a sharpening filter that varies as a function of the reduction ratio. The arithmetic formulas for determining the sharpening filter according to the selected reduction ratio are stored in the sharpening filter memory 16b. In other words, the edges are not uniformly emphasized by way of a same filtering process regardless of the sharpness of the edges that changes as a function of the reduction ratio but are subjected to a filtering process that varies as a function of the reduction ratio. Therefore, when the reduced image is formed by any of various possible reduction ratios, the extent of emphasizing the edges of the reduced image becomes appropriate (in other words, not too small and not too large) in the edge emphasizing process and a well-balanced reduced image can be formed.

Additionally, the level of amplification of the change in the density values executed by the sharpening filter is so arranged that the level is maximized when the reduction ratio is 50%. Therefore, a reduced image that suffers from no too-much emphasized edges but that is well balanced over the entire area of the image can be produced over the entire range of reduction if compared with a case where a sharpening filter, whose level of amplification simply follows the falling reduction ratio, is used.

Generally, the clearness or distinctness of a reduced image is degraded as the reduction ratio decreases. Then, as a result, the edges in the image become unclear accordingly. If, however, the change in the density values at the edges of a reduced image were amplified proportionally relative to the decrease of the reduction ratio, the edges will possibly become too stand out relative to the other parts of the image to make the entire image unbalanced. However, according to the present embodiment, the change in the density values of pixels is amplified with a high amplification level when the degree of reduction is in an intermediate range, but the change in the density values of pixels is amplified with a low amplification level when the degree of reduction is in a low or high range so that edges are not excessively emphasized and a well-balanced agreeable image with appropriately emphasized edges can be produced regardless of the reduction ratio. More specifically, for those images that are reduced at the reduction ratio between about 43% and about 57%, the image quality can be effectively improved by amplifying the change in the density values of pixels with a high amplification level.

With reference back to FIG. 1C, the keyboard 17 is used by the user to input data and commands to the PC 10. The keyboard 17 includes a keyboard and a mouse. The LCD 18 displays characters and images for the user to visually confirm the contents of the process to be executed and the data and the command he or she inputs. The reduced image formed by the image processing program is also displayed on the LCD 18.

The interface 19 connects the PC 10 and the printer 20. The PC 10 transmits printing commands and printing data to the printer 20 by way of the interface 19 and the cable 21 connected to the printer 20, and controls the printer 20 to execute an operation of printing images on sheets of recording paper.

As shown in FIG. 1C, the PC 10 is connected to the printer 20 to which printing data is output. The printer 20 is a general type inkjet printer that includes a CPU that is a calculating unit, a ROM that is a read only non-volatile memory storing control programs to be executed by the CPU and a RAM that is a rewritable volatile memory for temporarily storing various data when a control program is executed by the CPU as well as a motor for conveying a recording medium, a printing head for forming an image by ejecting ink onto the recording medium, a carriage motor for driving (moving) the printing head and an interface for communicating with the PC 10. The printer 20 is adapted to print on a recording medium the printing data the printer 20 receives from the PC 10 by way of the interface.

Note, however, that the printer 20 may not necessarily be an inkjet printer and may alternatively be a laser printer that prints images by using toner. Additionally, the apparatus connected to the PC 10 is not limited to a printer and may alternatively be a facsimile machine, a copying machine or a multifunction device having a printing feature.

Now, the process of producing a reduced image according to the image processing program of the present embodiment will be described below by referring to FIGS. 4A-4C.

Figure 4B:
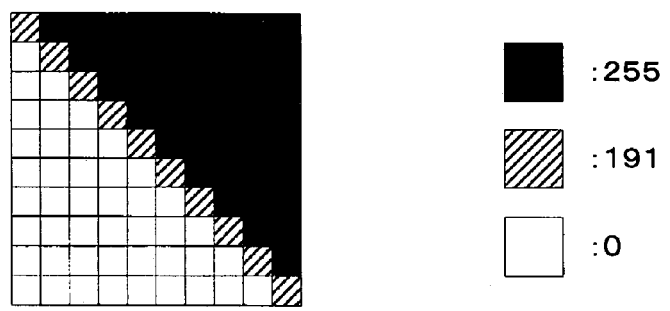
Figure 4C:
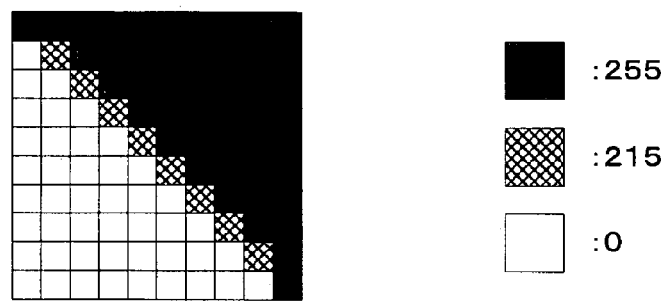

FIGS. 4A through 4C schematically illustrate the process of producing a reduced image according to the image processing program of this embodiment. Each of the images illustrated in FIGS. 4A through 4C is formed by a set of small squares and each square represents a pixel. The squares are represented according to the pixel values (density values) that are between 0 and 255. The squares for a pixel value of 255 are solid black squares and squares for a pixel value of 0 are solid white squares. The squares for a pixel value of 191 that is an intermediate density are shaded squares and the squares for a pixel value of 215 that is another intermediate density are net pattern squares.

FIG. 4A shows an original image that is generated according to another image processing program and stored in the memory for image to be processed 13b and that is to be subjected to the reduction process of the present embodiment. The original image is of black and white, where pixel values are only 255 and 0, and a ridge line, or boundary line, where the pixel value (density value) changes dramatically, extends from the left top corner to the right bottom corner to define an edge.

FIG. 4B shows a reduced image formed by dimensionally reducing the image of FIG. 4A according to the image processing program of this embodiment through the average pixel method with a reduction ratio of 50%. With the average pixel method, the pixel values of every predetermined number of pixels are averaged, and the average values are used as pixel values in the reduced image. Therefore, while the pixel value changes from 0 to 255 along the edge, the pixel value changes from 0 to 191 and then to 255 along the edge to make the density gradation less sharp along the edge. In other words, the edge of the reduced image produced through the average pixel method is less clear and wider than the edge of the original image.

FIG. 4C shows an image produced by executing an edge emphasizing process on the reduced image in FIG. 4B according to the image processing program of the present embodiment.

With the edge emphasizing process, the edges in an image are emphasized through a filtering process using an 8-neighbors sharpening filter as described above. More specifically, a pixel to be processed (center pixel) and surrounding eight pixels that are neighboring the center pixel are extracted. The extracted nine pixels are subjected to an operation of determining a product sum with respect to the nine component values of the 8-neighbors sharpening filter. More specifically, pixel values of the surrounding eight pixels are multiplied respectively by the component values of the surrounding elements in the 8-neighbors sharpening filter, while the pixel value of the center pixel is multiplied by the component value of the center element in the 8-neighbors sharpening filter. Then, the products of the multiplications are added together, and the result is determined as the pixel value of the center pixel that is determined through the filtering process. Thus, the filtering process executed on the single pixel by using the 8-neighbors sharpening filter is completed.

In the filtering process, the pixel value of the single pixel to be processed (center pixel) is converted into a value obtained by taking the pixel values of the surrounding eight pixels into consideration. In other words, the component values of the surrounding elements in the 8-neighbors sharpening filter operate as weights for controlling the extent of adding the values of surrounding pixels when arithmetically determining the pixel value of the object to be processed.

As a result of executing such an edge emphasizing process on the reduced image as shown in FIG. 4B, the pixel values at the edge that has been 191 is increased to 215 as shown in FIG. 4C. In other words, the density change at the edge in the reduced image is amplified to improve the sharpness of the edge.

Now, the process of generating a reduced image based on an original image according to the image processing program of this embodiment will be described with reference to FIG. 5A.

FIG. 5A is a flowchart of the image processing program that generates a reduced image based on an original image.

The image processing program is started being executed when the user inputs the PC 10 with his/her instruction to dimensionally reduce an original image and his/her desired reduction ratio.

When the image processing program is started, first, a reduced image data generating process is executed in step T1. In step T1, the user's desired reduction ratio is stored in the reduction ratio memory 13*d*. Also in step T1, the original image, whose data is stored in the memory for image to be processed 13*b*, is dimensionally reduced at the reduction ratio through the average pixel method, to thereby produce a reduced image. Data of the thus produced reduced image is stored in the reduced image memory 13*c*.

Next, in step T2, an edge emphasizing process is executed on the reduced image, and data of the edge-emphasized reduced image is overwritten on the reduced image data in the reduced image memory 13*c*.

The edge emphasizing process of T2 will be described below in greater detail by referring to the flowchart of FIG. 5B.

Figure 5B:
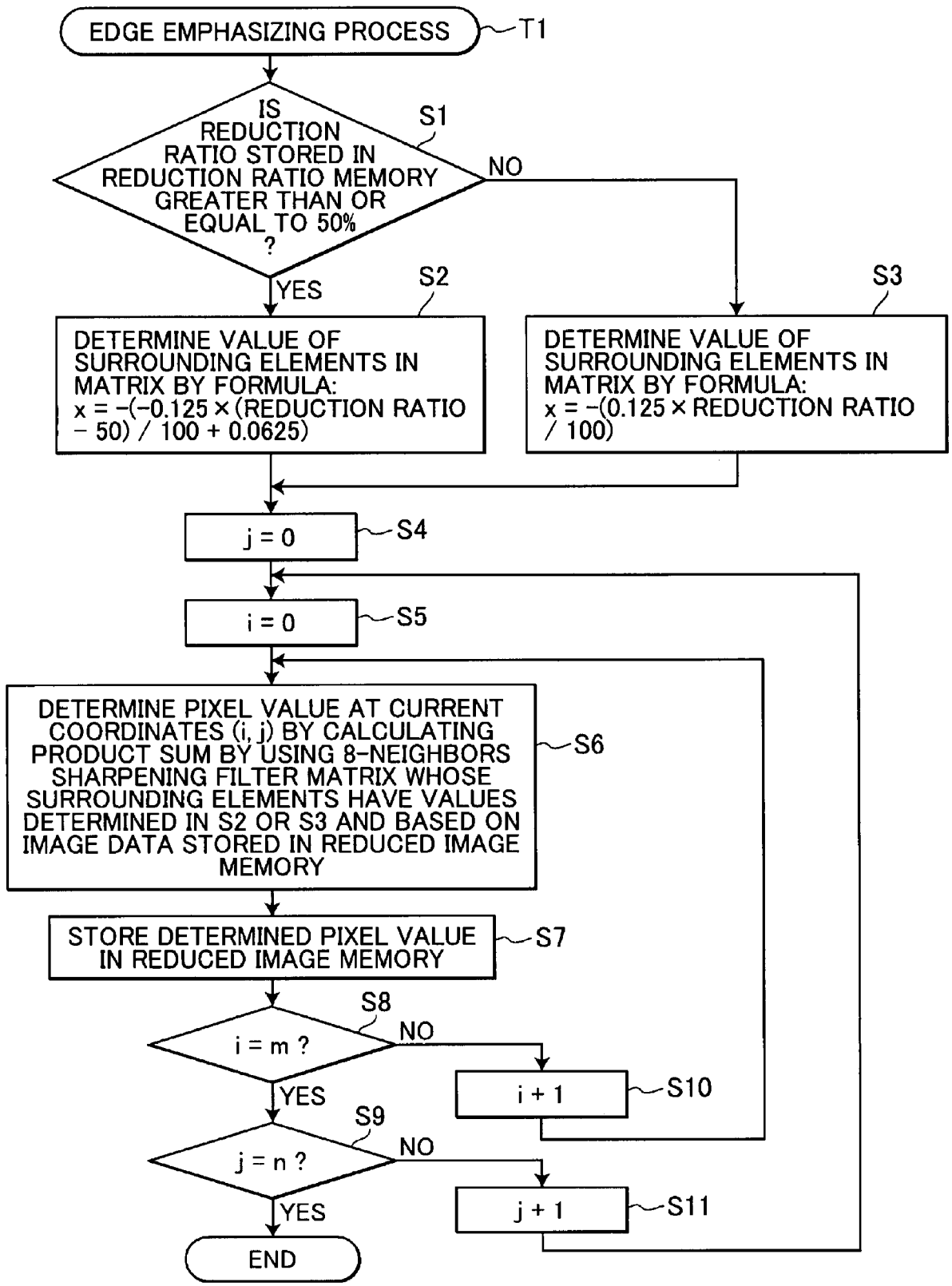
FIG. 5B is a flowchart of an edge emphasizing process in the image processing process of FIG. 5A.

FIG. 5B is a flowchart of the edge emphasizing process of T2 that is executed on the reduced image that is produced through the average pixel method of T1.

In the edge emphasizing process, first, it is confirmed in S1 whether or not the reduction ratio that is input and stored in the reduction ratio memory 13*d* is greater than or equal to 50%.

If the reduction ratio is greater than or equal to 50% (S1: Yes), the values of the surrounding elements in the sharpening filter are computed in S2 by using the corresponding arithmetic formula stored in the sharpening filter memory 16*b*, or x=−(−0.125×(reduction ratio−50)/100+0.0625).

On the other hand, if the reduction ratio is less than 50% (S1: No), the values of the surrounding elements in the sharpening filter are computed in S3 by using the corresponding arithmetic formula stored in the sharpening filter memory 16*b*, or x=−(0.125×reduction ratio/100).

After the processing step of S2 or S3, the variable j is set to zero (0) in S4 and the variable i is set to zero (0) in S5 in order to indicate the position coordinates of the pixel to be processed. The pixel values of the reduced image data that are stored in the reduced image memory 13*c* are managed in correspondence to the position coordinates, and position coordinates from the leading coordinates (0, 0) to the ending coordinates (m, n) are respectively assigned to them.

Then, in S6, based on the reduced image data stored in the reduced image memory 13*c*, the pixel value at the current position coordinates (i, j) is subjected to an operation of determining a product sum by using the 8-neighbors sharpening filter whose surrounding elements have the component values determined in S2 or S3.

As described above, the 8-neighbors sharpening filter is in a 3×3 matrix form, and all the eight component values of the surrounding elements are equal to one another, while the component value of the center element is equal to a sum of one (1) and a value obtained by inverting the sign of the total sum of the component values of the eight surrounding elements. Thus, the 8-neighbors sharpening filter is determined on the basis of the component values of the surrounding elements as computationally determined in the processing step of S2 or S3. The process of determining the 8-neighbors sharpening filter to be used in S6 is executed after executing the process of S2 or S3 and before executing the process of S6.

In the operation of determining a product sum that is executed in S6 by using the 8-neighbors sharpening filter, the pixel with position coordinates (i, j) is selected, and nine pixels that include the selected pixel and eight surrounding pixels are extracted as pixels to be processed. Then, the pixel values of the surrounding eight pixels are multiplied respectively by the component values of the corresponding surrounding elements in the 8-neighbors sharpening filter while the pixel value of the pixel at the position coordinates (i, j) is multiplied by the component value of the center element in the 8-neighbors sharpening filter and, subsequently, the products of the multiplications are added together so as to determine the sum as the pixel value of the pixel at position coordinates (i, j). With the above described arithmetic operation, the pixel values are computationally determined as a result of the filtering process of the 8-neighbors sharpening process. Depending on the position of the selected pixel, the number of pixels surrounding the selected pixel may be smaller than eight. In such a case, the determined component values of the 8-neighbors sharpening filter are partly used to execute the filter process by proportionally using the component values according to the number of the extracted pixels.

Subsequently, the pixel values subjected to the above arithmetic operation, or the reduced image data with emphasized edges, are written in the reduced image memory 13*c* (S7). Thus, the reduced image data produced in T1 and stored in the reduced image memory 13*c* for the subject pixel is overwritten with the edge-emphasized reduced image data produced in S7 for the subject pixel.

Thereafter, in S8 it is judged whether or not the variable i reaches the final value m (the last coordinate in the X direction). If the variable i=m (S8: Yes), it is further judged in S9 whether or not the variable j reaches the final value n (the last coordinate in the Y direction). If the variable j=n (S9: Yes), the filtering process for emphasizing the edges has been completed down to the position coordinates (m, n) on all the pixel values so that the edge emphasizing process is ended.

If, on the other hand, the variable i does not reach the final value m (the last coordinate in the X direction) (S8: No), one (1) is added to the variable i in S10 in order to shift the position coordinates and specify the next pixel value (in the X direction) and the process moves back to S6.

If, similarly, the variable j does not reach the final value n (the last coordinate in the Y direction) (S9: No), one (1) is added to the variable j in S11 in order to shift the position coordinates and specify the next pixel value (in the Y direction) and the filtering process moves back to S5. Since the variable i is set to zero (0) in the processing step S5, the filtering process is executed from the leading position of the X coordinate for the Y coordinate shifted by the processing operation of S11 so that the processing operations of S5 through S11 are repeated until the position coordinates (m, n) are reached.

As described above, the edge emphasizing process is executed by using a sharpening filter whose component values vary as a function of the reduction ratio. Thus, the edges are not uniformly emphasized by way of a same filtering process regardless of the sharpness of the edges that changes as a function of the reduction ratio, but are subjected to a filtering process that varies as a function of the reduction ratio. Therefore, according to the edge emphasizing process, the extent of emphasizing the edges of the reduced image is not too small and not too large in the edge emphasizing process and a well-balanced reduced image can be formed.

Next, a modification of the edge emphasizing process will be described by referring to FIGS. 6A through 8.

In the above description, an 8-neighbors sharpening filter is determined according to any of the selectable reduction ratios. On the other hand, in this modification, an edge emphasizing process is executed on a reduced image by using a corresponding one of a plurality of different 8-neighbors sharpening filters that are stored in advance. Additionally, the selectable range of reduction ratio is divided into several blocks and 8-neighbors sharpening filters are provided to correspond respectively to the blocks. In other words, the same 8-neighbors sharpening filter is used for different reduction ratios in the edge processing process so long as the reduction ratios belong to a same block. In this modification, the sharpening filter memory 16b stores the component values of the 8-neighbors sharpening filters in correspondence with the blocks, although the sharpening filter memory 16b stores the arithmetic formulas in the first embodiment. Additionally, the edge emphasizing process of T2 is executed as shown in FIG. 8 according to the present modification, although the edge emphasizing process of T2 is executed as shown in FIG. 5B according to the first embodiment.

Except for the above-described points, the present modification is the same as the first embodiment.

Figure 6A:
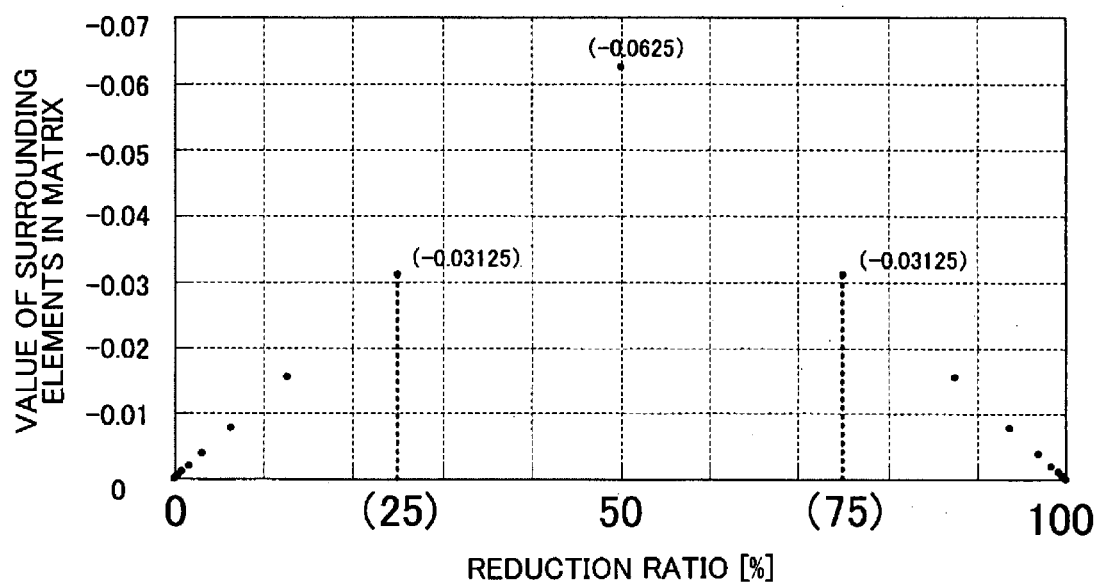
Figure 6B:
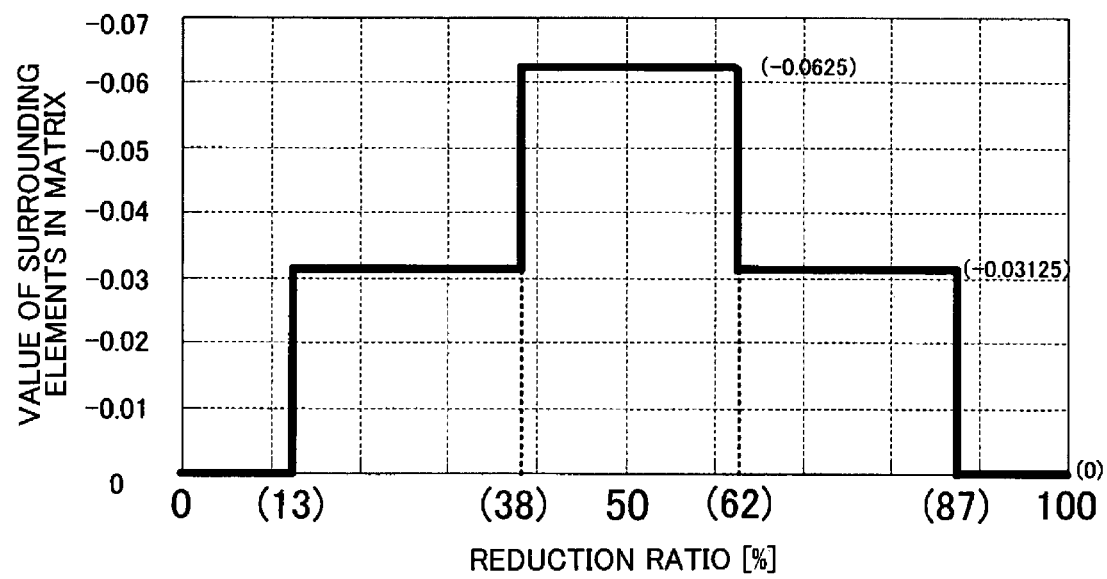

FIGS. 6A and 6B schematically illustrate the component values of the surrounding elements in the 8-neighbors sharpening filters stored in the sharpening filter memory 16b for the present modification.

FIG. 6A is a graph illustrating the theoretical concept of the sharpening filters of the present modification by showing the corresponding relationship between the reduction ratios and the component values of the surrounding elements.

FIG. 6B is a graph illustrating the corresponding relationship between the reduction ratios and the component values that are actually stored in the sharpening filter memory 16b.

In FIG. 6A, the horizontal axis indicates the reduction ratio (%) and the vertical axis indicates the component value of the surrounding elements in the sharpening filters. The component values that the surrounding elements in the 8-neighbors sharpening filters of the present modification can take are plotted by black spots in the graph in FIG. 6A.

As shown in FIG. 6A, the component values of the surrounding elements in the 8-neighbors sharpening filters of the present modification are not continuous but are quantized values ($-\frac{1}{2}^n$), wherein n is an integer greater than or equal to four (4). That is, the component values of the surrounding elements are the reciprocals of the two (2) to the n-th power. While the component values of the surrounding elements can be defined by using linear functions where the smallest value arises when the reduction ratio is 50% and the value of the corresponding one of the functions linearly increases as the reduction ratio approaches 0% or 100% as described above, only the values that are defined by $-\frac{1}{2}^n$ are selected for the component values of the surrounding elements out of the values that can be determined by the linear functions.

Thus, with this arrangement, for example, it is known that as the component values of the surrounding elements, $-0.0625$ ($=-\frac{1}{2}^n$ (where n=4)) can be used for the reduction ratio of 50%, $-0.03125$ ($=-\frac{1}{2}^n$ (where n=5)) can be used for the reduction ratio of 25% and 75%, and $-\frac{1}{2}^n$ with a larger power ($n \geq 6$) can be used for a range of reduction ratio greater than or equal to 0% and less than 25% and for a range of reduction ratio more than 75% and smaller than or equal to 100% as shown in FIG. 6A. Thus, the values shown in FIG. 6A are theoretically applicable as the component values of the surrounding elements. However, the three values of 0, $-0.03125$ and $-0.0625$ are actually selected as the component values of the surrounding elements as shown in FIG. 6B.

In FIG. 6B, the horizontal axis indicates the reduction ratio (%) and the vertical axis indicates the component values of the surrounding elements. The relationship between the component values of the surrounding elements and the reduction ratios are indicated by the solid line in the graph of FIG. 6B. The component values of the surrounding elements are changed stepwise to take values of 0, $-0.03125$ and $-0.0625$ as the reduction ratio changes toward the reduction ratio of 50%.

Additionally, the component values of the surrounding elements are equal to the smallest value of $-0.0625$ in a predetermined range (intermediate range) that includes the reduction ratio of 50%. The component values of the surrounding elements are changed stepwise to the smallest value of $-0.0625$ as the reduction ratio approaches the intermediate range. Thus, when the reduction ratio is found within the intermediate range, the edge emphasizing process is executed by using the 8-neighbors sharpening filter whose amplification level for amplifying the change in the density values at the edges is the highest. In other words, as the reduction ratio approaches the intermediate range, an 8-neighbors sharpening filter showing a higher amplification level is used to execute the edge emphasizing process.

The ranges of reduction ratio that correspond to the different component values of the surrounding elements are defined according to the relationship between the reduction ratios and the component values of the surrounding elements shown in FIG. 6A. FIG. 6A shows that $-0.0625$ is the component values of the surrounding elements that correspond to the reduction ratio of 50%, and $-0.03125$ is the component values of the surrounding elements that correspond to the reduction ratios 25% and 75%. It is noted that 37.5% is the median value of a range between 25% and 50%, and 62.5% is the median value of a range between 50% and 75%. Each of the above range has a width of 25%.

Thus, an intermediate range that ranges between more than 38% and not more than 62%, that has a width of about 25%, and that has a point of 50% interposed therein is defined as a range that corresponds to the component value of $-0.0625$ for the surrounding elements. A low reduction ratio range that ranges between more than 13% and not more than 38%, that has a width of about 25%, and that has a point of 25% therein is defined as a range that corresponds to the component value of $-0.03125$. A high reduction ratio range that ranges between more than 62% and not more than 87%, that has a width of about 25%, and that has a point of 75% therein is defined as another range that corresponds to the component value of $-0.03125$. The remaining ranges not more than 13% and not less than 88% are defined to be ranges that correspond to the component value of zero (0).

Note, however, that the intermediate range, the low reduction ratio range, and the high reduction ratio range are not limited to those defined above, and may appropriately be defined differently. For example, a range between not less than 43% and not more than 57% may be defined to be an intermediate range.

Therefore, the component value of the surrounding elements of zero (0) is associated with the range of reduction ratio not less than 0% and not more than 13% and the range of reduction ratio not less than 88% and not more than 100%. The component value of the surrounding elements of −0.03125 is associated with the range of reduction ratio more than 13% and not more than 38% and the range of reduction ratio more than 62% and not more than 87%. The component value of the surrounding elements of −0.0625 is associated with the range of reduction ratio more than 38% and not more than 62%. Those component values of the surrounding elements are stored in the sharpening filter memory 16$b$.

In this modification, the sharpening filter memory 16$b$ also stores the component value of the center element in advance in correspondence with the component values of the surrounding elements in correspondence with each range or reduction ratio. In other words, the sharpening filter memory 16$b$ stores three different 8-neighbors sharpening filters in correspondence with the five ranges of reduction ratio.

FIGS. 7A through 7C schematically illustrate 8-neighbors sharpening filters that are to be used in the modification of the first embodiment.

FIG. 7A shows a theoretical model of each 8-neighbors sharpening filter that is used in this modification, where the component values of the surrounding elements are defined by $-\frac{1}{2}''$. Therefore, the component value of the center element that is defined as a sum of one (1) and a value obtained by inverting the sign of the total sum of the component values of the eight surrounding elements is expressed as $(\frac{1}{2}'') \times 8 + 1$.

FIGS. 7B and 7C show examples of the 8-neighbors sharpening filters that are actually used in the modification and are stored in the sharpening filter memory 16$b$. More specifically, FIG. 7B shows an 8-neighbors sharpening filter, whose surrounding elements have component values of −0.0625 and that can be used in the edge emphasizing process for reduced images with the range of reduction ratio between more than 38% and not more than 62%, whereas FIG. 7C shows another 8-neighbors sharpening filter, whose surrounding elements have component values of −0.03125 and that can be used in the edge emphasizing process for reduced images with the range of reduction ratio between more than 13% and not more than 38% and the range of reduction ratio between more than 62% and not more than 87%.

Since the component values of the surrounding elements in any of the 8-neighbors sharpening filters that are used in the modification are expressed by $-\frac{1}{2}''$, the operation of multiplications of the pixel values and the component values of the surrounding elements can be carried out by using shift operations for determining the product sum of the pixel values and the component values of the 8-neighbors sharpening filter. In other words, the arithmetic operations can be carried out very fast. Particularly, since the filtering process for the edge emphasizing process needs to be executed on each of the pixels of a reduced image, a large amount of data has to be processed. Therefore, the time required for the filtering process can be dramatically reduced by using $-\frac{1}{2}''$ for the component values of the surrounding elements and simplifying the operation of multiplications of the component values of the surrounding elements and the pixel values.

Now, the edge emphasizing process of the modification will be described by referring to the flowchart of FIG. 8. FIG. 8 is a flowchart of the edge emphasizing process T2 in FIG. 5A that is executed according to the modification.

In the edge emphasizing process of the modification, one of the 8-neighbors sharpening filters stored in advance in the sharpening filter memory 16$b$ is selected in response to the reduction ratio that is input in T1 according to an operation by the user (selected reduction ratio), and the filtering process for emphasizing the edges is executed by using the selected 8-neighbors sharpening filter.

That is, according to the present modification, the edge emphasizing process of T2 is executed as shown in FIG. 8.

In the edge emphasizing process, first, it is checked whether or not the reduction ratio that is stored in T1 in the reduction ratio memory 13$d$ is in the range greater than or equal to 0% and smaller than or equal to 13%, or in the range more than 87% and smaller than or equal to 100% (S21). If the reduction ratio is greater than or equal to 0% and smaller than or equal to 13%, or more than 87% and smaller than or equal to 100% (S21: Yes), in S22, data of the 8-neighbors sharpening filter that corresponds to the range of reduction ratio, that is, the 8-neighbors sharpening filter whose surrounding elements have the component values of zero (0) and the center element has the component value of one (1) is read out from the sharpening filter memory 16$b$ in S22.

Then, the variable j is set to zero (0) in S23, and then the variable i is set to zero (0) in S24 in order to indicate the position coordinates of the pixel to be processed. Then, the product sum of the pixel value of the pixel of the current coordinate values (i, j) and the 8-neighbors sharpening filter read out from the sharpening filter memory 16$b$ is determined on the basis of the reduced image data stored in the reduced image memory 13$c$ in S25, and the pixel value obtained as a result of the arithmetic operations is written in the reduced image memory 13$c$ in S26. Thus, edge-emphasized reduced image data is written over the reduced image data for the subject pixel.

Thus, in the operation of determining the product sum that is executed in S25 by using the 8-neighbors sharpening filter, nine pixels, that is, the pixel with the position coordinates (i, j) that is to be processed and its surrounding eight pixels are extracted and the pixel values of the eight surrounding pixels are multiplied respectively by the component values of the surrounding elements in the 8-neighbors sharpening filter while the pixel value of the pixel with the position coordinates (i, j) is multiplied by the component value of the center element in the 8-neighbors sharpening filter. Subsequently, the products of the multiplications are added together and the resultant sum is determined as the pixel value of the pixel with the position coordinates (i, j).

If the component values of the surrounding elements in the 8-neighbors sharpening filter are not equal to zero (0), they are expressed by $-\frac{1}{2}''$. Thus, the operation of multiplications of the pixel values of the eight surrounding pixels and the component values of the eight surrounding elements are carried out by executing shift operations. In other words, the filtering process for emphasizing the edges can be executed at high speed.

After the processing step of S26, it is judged in S27 whether or not the variable i reaches the final value m. If the variable i=m (S27: Yes), it is further judged in S28 whether or not the variable j reaches the final value. If the variable j=n (S28: Yes), the filtering process for emphasizing the edges has been completed on all the pixel values, and the edge emphasizing process is ended.

If the reduction ratio stored in the reduction ratio memory 13$d$ is neither in the range greater than or equal to 0% and smaller than or equal to 13% nor in the range more than 87% and smaller than or equal to 100% (S21: No), then, it is further checked in S29 whether or not the reduction ratio is either in the range more than 13% and smaller than or equal to 38%, or in the range more than 62% and smaller than or equal to 87%. If the reduction ratio is either in the range more than 13% and smaller than or equal to 38%, or in the range more than 62% and smaller than or equal to 87% (S29: Yes), in S30, data of the 8-neighbors sharpening filter that corresponds to the range of reduction ratio and whose surrounding elements have the component values of −0.03125 and whose center element has the component value of 1.25 is read out from the sharpening filter memory 16b. Then, the process proceeds to S23. As a result, a filtering process for emphasizing the edges is executed in S25 by using the 8-neighbors sharpening filter that has the component values of −0.03125 for the surrounding elements and the component value of 1.25 for the center element.

If the reduction ratio is neither in the range more than 13% and smaller than or equal to 38% nor in the range more than 62% and smaller than or equal to 87% (S29: No), it is known that the reduction ratio stored in the reduction ratio memory 13d is in the range more than 38% and smaller than or equal to 62%. Then, in S31, data of the 8-neighbors sharpening filter that corresponds to the range of reduction ratio and whose surrounding elements have the component values of −0.0625 and whose center element has the component value of 1.5 is read out from the sharpening filter memory 16b. Then, the process proceeds to S23. As a result, a filtering process for emphasizing the edges is executed in S25 by using the 8-neighbors sharpening filter having the component values of −0.0625 for the surrounding elements and the component value of 1.5 for the center element.

If the variable i does not reach the final value m (the last coordinate in the X direction) (S27: No), one (1) is added to the variable i in S32 and the process moves back to S25. If the variable j does not reach the final value n (the last coordinate in the Y direction) (S28: No), one (1) is added to the variable j in S33 and the filtering process moves back to S24.

It is noted that if the reduction ratio is in the range greater than or equal to 0% and smaller than or equal to 13%, or in the range more than 87% and smaller than or equal to 100% (Yes in S21), the pixel value is not changed as a result of a filtering processing by using the corresponding 8-neighbors sharpening filter whose surrounding elements have values of zero (0) and whose center element has the value of one (1). Accordingly, when the judgment of S21 becomes affirmative (yes in S21), the processing steps from S22 may be skipped to end the edge emphasizing process.

As described above, with the image processing program of the modification, since the component values of the surrounding elements in the sharpening filter are defined to be −½$^n$, the operation of multiplications of the pixel values and the component values of the surrounding elements can be carried out by executing shift operations in the filtering process using the sharpening filter. In other words, the filtering process for emphasizing the edges can be carried out very fast.

More specifically, the operation of correcting the density value of each pixel in the reduced image can be carried out by executing a shift operation of shifting the bit arrangement. Therefore, the operation process can be executed efficiently to reduce the time required for the entire process. Particularly, image data generally include a large quantity of data for forming a single image so that the image processing will be complex and involve a long processing time. However, the complexity of the process can be alleviated and the time required for the process can be reduced remarkably by correcting the density value of each pixel in the image data of the reduced image through multiplications or divisions, using the reciprocal number of 2 to the n-th power.

Next, a second embodiment will be described by referring to FIG. 9.

In the first embodiment, the edges of a reduced image are emphasized through the image processing program, or software. According to the second embodiment, the process of emphasizing the edges of a reduced image is executed by a hardware circuit. Accordingly, the sharpening filter memory 16b is omitted from the second embodiment, and the edge emphasizing process of T2 is omitted from the image processing program of FIG. 5A.

Figure 9:
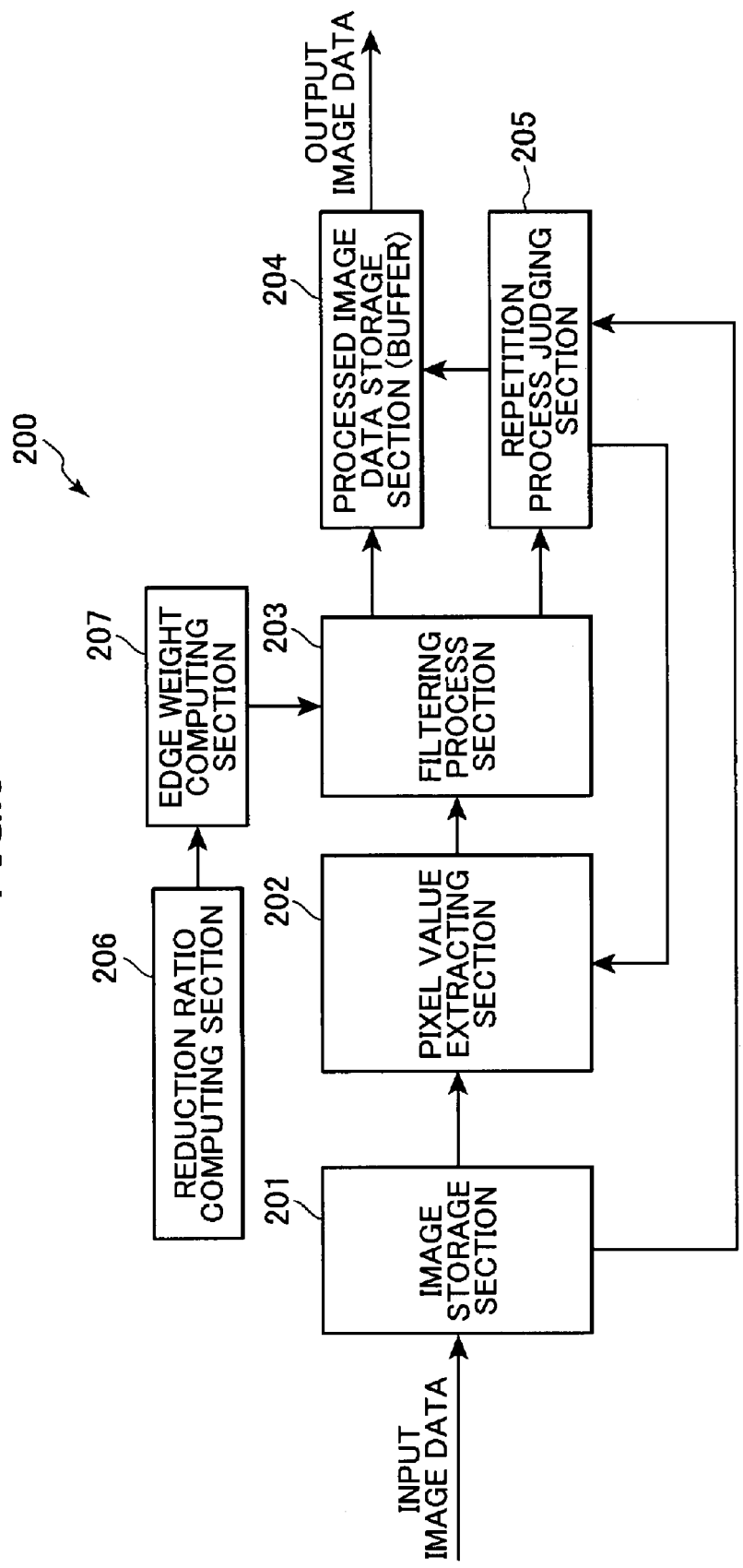
FIG. 9 is a schematic block diagram of an edge emphasizing circuit provided in a personal computer according to the second embodiment.

FIG. 9 is a schematic block diagram showing the configuration of an edge emphasizing circuit 200 mounted in the PC 10 of the second embodiment. As shown in FIG. 9, the edge emphasizing circuit 200 includes an image storage section 201, a pixel value extracting section 202, a filtering process section 203, a processed image data storage section 204, a repetition process judging section 205, a reduction ratio computing section 206 and an edge weight computing section 207.

The image storage section 201 has a memory for storing the reduced image prepared by the PC 10 in T1 of FIG. 5A. The image storage section 201 is adapted to input the reduced image data outputted from the step T1 by the PC 10 and to write the input reduced image data in its internal memory with associated position coordinates. The data of the reduced image whose edges are to be emphasized (input reduced image data) is stored in the image storage section 201. The reduced image data includes the pixel value for each pixel expressed by a value between 0 and 255 (8 bits) indicative of the density of the pixel, and is input by a unit of eight bits sequentially according to the position coordinates from step T1. When the operation of writing the reduced image data in the memory is completed, the image storage section 201 inputs data indicating the last position coordinates of the reduced image data stored in the internal memory to the pixel value extracting section 202 and, at the same time, inputs the data indicating the data size (number of pixels) to the repetition process judging section 205.

The pixel value extracting section 202 includes: an internal memory for storing the position coordinates of the pixel to be processed; and a position coordinates updating circuit for updating the position coordinates in the memory so as to indicate the next positional coordinates in response to each signal input from the repetition process judging section 205. The pixel value extracting section 202 is adapted to extract the pixel values of nine pixels including the pixel to be processed and the eight pixels surrounding the pixel to be processed from the image storage section 201 according to the position coordinates held in the internal memory.

It is noted that when the pixel to be processed is located at an end, the number of pixels surrounding the subject pixel is less than eight. In such a case, the pixel values of only those pixels that surround the pixel to be processed are extracted.

When a signal is input to the pixel value extracting section 202 from the repetition process judging section 205, the positional coordinate updating circuit updates the position coordinates stored in the internal memory to the next position coordinates, referring to the values of the last position coordinates held in the internal memory and extracts the pixel value that corresponds to the updated position coordinates (the pixel value of the pixel to be processed and the pixel values of the surrounding pixels) from the image storage section 201. The pixel values extracted by the pixel value extracting section 202 are input to the filtering process section 203.

The reduction ratio computing section 206 is adapted to computationally determine the reduction ratio of the reduced image data stored in the image storage section 201 by comparing the data size of the reduced image and that of the original image data, and inputs the computationally determined reduction ratio to the edge weight computing section 207.

The edge weight computing section 207 determines the component values of the surrounding elements according to the reduction ratio that is input from the reduction ratio computing section 206. More specifically, the computing section 207 determines whether or not the reduction ratio input from the reduction ratio computing section 206 is greater than or equal to 50% by using a comparator, and determines the component values (weights) of the surrounding elements by computing −(−0.125×(reduction ratio−50)/100+0.0625) when the reduction ratio is determined to be greater than or equal to 50%, whereas the section 207 determines the component values (weights) of the surrounding elements by computing −(0.125×reduction ratio/100) when the reduction ratio is determined to be less than 50%. Then, the section 207 outputs the outcome of the computation, or the component values (weights) of the surrounding elements, to the filtering process section 203.

The filtering process section 203 performs an operation (filtering process) of determining the product sum of the pixel values input from the pixel value extracting section 202 and the component values of the 8-neighbors sharpening filter of 3×3 matrix form similarly to the first embodiment. More specifically, the filtering process section 203 generates an 8-neighbors sharpening filter by computationally determining the component value of the center element on the basis of the component values of the surrounding elements in the 8-neighbors sharpening filter input from the edge weight computing section 207 and executes the filtering process by using the generated 8-neighbors sharpening filter.

The filtering process section 203 multiplies the pixel values input from the pixel value extracting section 202 respectively by the corresponding component values of the 8-neighbors sharpening filter and adds the products of the multiplications to obtain the total sum. Then, the section 203 inputs the computed value (pixel value) to the processed image data storage section 204, associating the value with the original position coordinates. Additionally, each time the filtering process section 203 outputs a pixel value to the processed image data storage section 204, the filtering process section 202 also outputs a signal indicating the output of the pixel value to the repetition process judging section 205.

The processed image data storage section 204 is a buffer that temporarily stores the reduced-and-filtered image data (pixel values) that has been subjected to the filtering process and that is inputted from the filtering process section 203, associating the data with the position coordinates. Further, the processed image data storage section 204 outputs the stored data to the outside, in response to an output instruction from the repetition process judging section 205.

The repetition process judging section 205 includes an internal counter for counting the number of executions of the filtering process and counts up the value stored in the internal counter by one in response to the signal inputted from the filtering process section 203. At the same time, the repetition process judging section 205 compares the reading of the counter with the number of pixels input from the image storage section 201 by using a comparator and inputs a signal to the pixel value extracting section 202 or the processed image data storage section 204 according to the outcome of the comparison.

The signal input to the repetition process judging section 205 from the filtering process section 203 indicates the completion of the filtering process executed on a pixel. Accordingly, the number of pixels on which the filtering process has been executed is known by counting up the internal counter by one in response to the input signal. If the reading of the internal counter and the total number of pixels are compared by the comparator and the outcome of the comparison made by the comparator is not equal to zero (0), it is known that the filtering process has not been completed for all the pixels of the reduced image. Accordingly, the repetition process judging section 205 outputs a signal requesting execution of a repetition process to the pixel value extracting section 202. If, on the other hand, the outcome of the comparison made by the comparator is equal to zero (0), it is known that the filtering process has been completed for all the pixels of the reduced image. In this case, the repetition process judging section 205 outputs a signal directing the processed image data storage section 204 to output data. Then, as a result, the edge emphasizing process is executed on all the pixels of the reduced image and the reduced image is output with the emphasized edges.

In this way, with the edge emphasizing circuit 200 of the second embodiment, the edge emphasizing process can be executed by using a hardware circuit. Then, the edge emphasizing process can be executed faster by the hardware circuit than by the CPU.

While one 8-neighbors sharpening filter is determined by computations according to the reduction ratio in the second embodiment, a memory for storing sharpening filters associated with respective reduction ratios may be provided and the edge emphasizing process may be executed by an appropriate one of the sharpening filters stored in the memory similarly to the modification of the first embodiment. The component values of the surrounding elements stored in the memory may be expressed by $-\frac{1}{2}^n$ and the filtering process section 203 may perform the operation of multiplications of the component values of the surrounding elements by executing shift operations.

While the invention has been described in detail with reference to the above aspects thereof, it would be apparent to those skilled in the art that various changes and modifications may be made therein without departing from the spirit of the invention.

For example, while the filtering process of emphasizing edges is executed by using 8-neighbors sharpening filters in each of the above described embodiments, sharpening filters are necessarily not limited to 8-neighbors sharpening filters, but 4-neighbors sharpening filters or other sharpening filters may alternatively be used.

While the filtering process is executed by using two sharpening filters that have component values of −0.03125 and −0.0625 for the surrounding elements in the modification of the first embodiment, other sharpening filters having component values expressed by $-\frac{1}{2}^n$ ($n \geq 6$) may be used to execute the edge emphasizing process. With such an arrangement, the edge emphasizing process can be executed by using sharpening filters that finely correspond to the reduction ratio and that finely adjust the balance of the emphasized edges and the entire reduced image.

The surrounding elements in the 8-neighbors sharpening filters may have component values of $(-\frac{1}{2}^n)$, wherein n is an integer smaller than four (4) and greater than or equal to zero (0).

In the second embodiment, the reduction ration computing section 206 may determine the reduction ratio by receiving data of the reduction ratio from the reduction ratio memory 13*d*.

What is claimed is:

1. A method for processing an image, comprising:
   determining a reduction ratio that falls within a predetermined range, the predetermined range including one reduction ratio and another reduction ratio different from the one reduction ratio;
   generating reduced image data indicative of a reduced image from original image data indicative of an original image based on the determined reduction ratio, the reduced image data indicating pixel values of pixels contained in the reduced image, the number of the pixels contained in the reduced image being smaller than the number of pixels contained in the original image;
   determining correction data dependently on the determined reduction ratio such that correction data that is determined dependently on the one reduction ratio is different from correction data that is determined dependently on the another reduction ratio; and
   correcting the pixel values of pixels belonging to edges in the reduced image by using the determined correction data, thereby emphasizing the edges in the reduced image.

2. The method according to claim 1,
   wherein the reduction ratio falls in either one of a low range that is lower than or equal to a predetermined first value, a high range that is higher than or equal to a predetermined second value higher than the predetermined first value, and an intermediate range defined higher than the predetermined first value and lower than the predetermined second value, the predetermined first value, the predetermined second value, the low range, the intermediate range, and the high range being within the predetermined range, and
   wherein the correction data is determined such that the correction data for the intermediate range attains a higher emphasizing level than the correction data for the low range and the correction data for the high range.

3. The method according to claim 2, wherein the correction data is determined such that the correction data gradually raises the emphasizing level to a predefined maximum level as the reduction ratio changes toward a predetermined intermediate value that is in the intermediate range.

4. The method according to claim 2, wherein the predetermined range is higher than 0% and lower than 100%, and the predetermined first value is equal to 43%, and the predetermined second value is equal to 57%.

5. The method according to claim 3, wherein the predetermined range is higher than 0% and lower than 100%, and the predetermined intermediate value is equal to 50%.

6. The method according to claim 2, wherein the correction data is determined such that the correction data changes stepwise as the reduction ratio changes toward the intermediate range, the correction data having one of zero (0) and a reciprocal of two (2) to the n-th power, wherein n is an integer greater than or equal to zero (0); and
   the correcting the pixel values of the pixels includes performing at least one of multiplication and division on the pixel value of each pixel in the reduced image by using the reciprocal of two (2) to the n-th power.

7. The method according to claim 1, wherein the correction data is determined to have one of zero (0) and a reciprocal of two (2) to the n-th power, wherein n is an integer greater than or equal to zero (0); and
   the correcting the pixel values of the pixels in the reduced image data by using the correction data includes performing at least one of multiplication and division on the pixel value of each pixel in the reduced image by using the reciprocal of two (2) to the n-th power.

8. The method according to claim 1, wherein the correcting the pixel values includes determining a sharpening filter that has a center element and surrounding elements that surround the center element, the surrounding elements having values indicated by the correction data and the center element having a value equal to a sum of one (1) and a value obtained by inverting the sign of a total of the values of the surrounding elements,
   the pixel value of each pixel in the reduced image being corrected by using the value of the center element of the sharpening filter, while using the pixel values of surrounding pixels that surround the subject pixel as being weighted by the values of the surrounding elements of the sharpening filter.

9. An image processing apparatus, comprising:
   a reduced image data storage portion storing reduced image data indicative of pixel values of pixels contained in a reduced image that is produced from an original image based on a reduction ratio that falls within a predetermined range, the number of the pixels contained in the reduced image being smaller than the number of pixels contained in the original image, the predetermined range including one reduction ratio and another reduction ratio different from the one reduction ratio;
   an image data write portion writing the reduced image data in the reduced image data storage portion;
   a reduction ratio storage portion storing the reduction ratio;
   a determining portion determining correction data dependently on the reduction ratio stored in the reduction ratio storage portion such that correction data that is determined dependently on the one reduction ratio is different from correction data that is determined dependently on the another reduction ratio; and
   a correction data processing portion correcting the pixel values of pixels belonging to edges in the reduced image by using the correction data determined by the determining portion, thereby emphasizing the edges in the reduced image.

10. The apparatus according to claim 9,
    wherein the reduction ratio stored in the reduction ratio storage portion falls in either one of a low range that is lower than or equal to a predetermined first value, a high range that is higher than or equal to a predetermined second value higher than the predetermined first value, and an intermediate range defined higher than the predetermined first value and lower than the predetermined second value, the predetermined first value, the predetermined second value, the low range, the intermediate range, and the high range being within the predetermined range, and
    wherein the determining portion determines the correction data such that the correction data for the intermediate range attains a higher emphasizing level than the correction data for the low range and the correction data for the high range.

11. The apparatus according to claim 10, wherein the determining portion determines the correction data such that the correction data gradually raises the emphasizing level to a predefined maximum level as the reduction ratio changes toward a predetermined intermediate value that is in the intermediate range.

12. The apparatus according to claim 10, wherein the predetermined range is higher than 0% and lower than 100%, and the predetermined first value is equal to 43%, and the predetermined second value is equal to 57%.

13. The apparatus according to claim 11, wherein the predetermined range is higher than 0% and lower than 100%, and the predetermined intermediate value is equal to 50%.

14. The apparatus according to claim 10, wherein the determining portion determines the correction data such that the correction data changes stepwise as the reduction ratio changes toward the intermediate range, the correction data having one of zero (0) and a reciprocal of two (2) to the n-th power, wherein n is an integer greater than or equal to zero (0); and the correction data processing portion includes an arithmetic operation portion performing at least one of multiplication and division on the pixel value of each pixel in the reduced image by using the reciprocal of two (2) to the n-th power.

15. The apparatus according to claim 9, wherein the correction data processing portion determines a sharpening filter that has a center element and surrounding elements that surround the center element, the surrounding elements having values indicated by the correction data and the center element having a value equal to a sum of one (1) and a value obtained by inverting the sign of a total of the values of the surrounding elements, the correction data processing portion correcting the pixel value of each pixel in the reduced image by using the value of the center element of the sharpening filter, while using the pixel values of surrounding pixels that surround the subject pixel as being weighted by the values of the surrounding elements of the sharpening filter.

16. A non-transitory storage medium storing a set of program instructions executable on a data processing device for processing images, the instructions comprising:

determining a reduction ratio that falls within a predetermined range, the predetermined range including one reduction ratio and another reduction ratio different from the one reduction ratio;

generating reduced image data indicative of a reduced image from original image data indicative of an original image based on the determined reduction ratio, the reduced image data indicating pixel values of pixels contained in the reduced image, the number of the pixels contained in the reduced image being smaller than the number of pixels contained in the original image;

determining correction data dependently on the determined reduction ratio such that correction data that is determined dependently on the one reduction ratio is different from correction data that is determined dependently on the another reduction ratio; and correcting the pixel values of pixels belonging to edges in the reduced image by using the determined correction data, thereby emphasizing the edges in the reduced image.

* * * * *